United States Patent [19]

Foenard

[11] 4,364,331
[45] Dec. 21, 1982

[54] FLOOR COVERING FOR STABLING

[75] Inventor: Pierre Foenard, Paris, France

[73] Assignee: Societe a Responsabilite Limitee: Societe de Development pour l'Agriculture Sodelvage, Sainte Gauburge, France

[21] Appl. No.: 293,845

[22] Filed: Aug. 18, 1981

Related U.S. Application Data

[63] Continuation of Ser. No. 166,651, Jul. 7, 1981, Pat. No. 4,338,369.

[30] Foreign Application Priority Data

May 30, 1980 [FR] France .............................. 80 12061

[51] Int. Cl.³ ......................... A01K 1/015; B32B 5/06
[52] U.S. Cl. ..................................... 119/28; 428/215;
428/280; 428/283; 428/284; 428/286; 428/287;
428/339; 428/341; 428/342
[58] Field of Search ............... 428/215, 280, 283, 284,
428/286, 287, 339, 341, 342; 119/28

[56] References Cited

U.S. PATENT DOCUMENTS

| 2,081,334 | 5/1937 | Kickenbush | 119/28 |
| 3,937,861 | 2/1976 | Zuckerman et al. | 428/235 |
| 4,038,944 | 8/1977 | Tucci | 119/28 |

FOREIGN PATENT DOCUMENTS

| 2102084 | 7/1972 | Fed. Rep. of Germany | 119/28 |
| 2748348 | 5/1979 | Fed. Rep. of Germany | 119/28 |
| 573928 | 3/1958 | Italy | 119/28 |
| 1138159 | 12/1968 | United Kingdom . | |

Primary Examiner—James C. Cannon
Attorney, Agent, or Firm—Roland Plottel

[57] ABSTRACT

A floor covering for stables comprising at least two tufted textile layers and a permeable, abrasion resistant material impregnated into the outer surface portion of the top layer and comprising a composition selected from the group consisting of acrylic resins, styrene-acrylic copolymers, polyvinyl chloride, and styrene-butadiene-acrylic copolymers.

14 Claims, 3 Drawing Figures

FLOOR COVERING FOR STABLING

This application is continuation of U.S. application Ser. No. 166,651, filed July 7, 1981, and now U.S. Pat. No. 4,338,369.

BACKROUND OF THE INVENTION

The present invention relates to a floor covering for stabling.

Since time immemorial straw has been used as bedding for domestic animals, and once soiled it has been used as manure.

These days straw is becoming relatively expensive and a regular supply is becoming difficult to obtain, particularly for those who keep animals but do not grow their own straw.

Further, the use of straw as bedding, even by farmers who grow their own, requires the use of special straw-handling equipment, (e.g. bailers) and storage locations (e.g. barns) together with the labour for collecting and storing the straw at harvest time and for frequent straw-handling throughout the year, i.e. mucking-out and laying new bedding.

The recent increases in the price of oil and its derivatives have led to projects for using straw for other uses, in particular as animal food, as heating fuel, and as raw material for synthesizing alcohol.

One proposal for overcoming these drawbacks has been to house animals in individual stalls known as "cubicles" or "cow-kennels" in which the floor is either a mud floor, or a wooden grating, or brick laid directly on earth, or concrete, and which are so arranged that a standing animal defecates (and urinates if female) directly into a gully provided beyond the end of that part of the floor which is occupied by the animal when lying down.

Unfortunately, mud floors, particularly in chalky ground, wear away locally, leaving holes which require constant attention and which are not always easy to fill in.

Wooden gratings or "duckboards" are hard for lying on, fairly expensive, and further they interfere with the flow of water when washing down.

Brick and concrete floors are not only hard, they are also cold.

Furthermore, such floors still require the use of some straw, albeit in reduced quantities, and they also have the drawback of encouraging various ailments in the animals using them, in particular their joints often become sprained, wrenched, deformed, rheumatic, or arthritic. It has also been proposed to cover floors for stabling by juxtaposing layers formed by natural textile and/or synthetic materials. However, the results obtained up till now are not satisfactory, manufactured covers having neither the resiliency nor the permeability necessary for the good accommodation of animals.

Proper use of a floor covering in accordance with the present invention greatly reduces the incidence of such damage, and overcomes the other drawbacks outlined above as well. Furthermore, it is easy to install and keep clean, and offers a high resistance to wear from animal hooves, together with great resiliency thereby ensuring a long useful life and relatively low cost.

SUMMARY OF THE INVENTION

The present invention provides floor covering for stabling, said covering comprising at least two layers of textile material held together by multiple needle perforations, one of said layers being a top layer and another being a bottom layer, the top surface of the said top layer having in particular high resistance to abrasion and its permeability allowing evaporation wherein said top layer situated on the side from which tufting is effected is impregnated at least in the neighbourhood of its top surface by at least one substance chosen from the group which includes an acrylic resin a reticulated copolymer based on acrylic resin and on styrene, and polyvinyl chloride, the impregnation rate lying between 500 and 2000 g of substance per square meter of surface.

BRIEF DESCRIPTION OF THE DRAWINGS

Other characteristics and advantages of the invention will appear from the following description given by way of example only with reference to the accompanying drawing in which.

DETAILED DESCRIPTION OF THE PREFERRED EMBODIMENT

Figure 1:
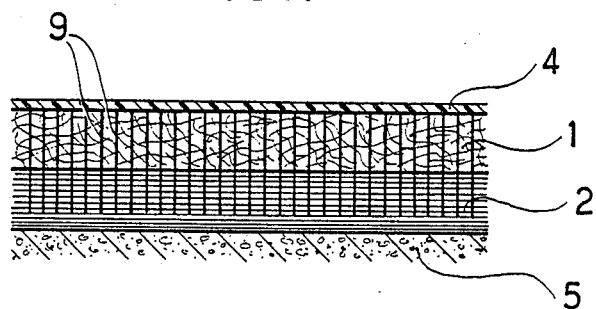
FIG. 1 is a cross-section through a first embodiment of floor covering in accordance with the invention.

With reference to FIG. 1, a floor covering, or mat, for stabling in accordance with the invention comprises two layers 1 and 2 of felt-like textile material held together by multiple needle perforations represented by vertical lines 9. No thread is required since the act of perforation provides sufficient intermingling of the fibres in the two layers to hold the layers together quite firmly. Close tufting is effected so as to increase the mechanical strength of the whole. Thus the density of perforation can be at least 100 to 120 per $cm^2$. Tufting is effected from the upper layer to the lower layer.

The felt-like layers of textile material are of the "non-woven" type, which is available in two major varieties which are made respectively from a tangle of short fibres or from continuous long fibres. In the floor covering shown in FIG. 1, the top layer 1 of textile material is made from a tangle of short fibres, while the bottom layer 2 is made from continuous long fibres.

Such felt-like materials can be manufactured by several different methods, including the wet method, the dry method, and extrusion of synthetic fibres constituted by polyamides, polyesters, polyolefins, and particularly polyethylene. Natural fibres may likewise be used either on their own or mixed with synthetic fibres. It is important that natural fibres, if used, are treated to avoid rotting, and preferred sources of natural fibres are wool or cotton waste.

The top surface of the top layer 1 is impregnated with a substance suitable for constituting an abrasion-resistant skin 4. This substance, may, for example, comprise a polymer of acrylic resin or a heat shrinkable copolymer of styrene and acrylic resin which is applied under pressure to the top surface of the layer 1, in such a manner that it penetrates a short distance into the layer of felt-like textile material. In places it may penetrate some of the perforations and it may even reach the bottom but overall it penetrates by two or so millimeters. After setting, it constitutes a porous skin which is highly resistant to abrasion by animal hooves, advantageously an acrylic styrene butadiene copolymer is used.

The skin-forming substance should be applied at a rate of about 500 to 2000 gm per square meter of floor covering. Polyvinyl chloride can also be used as an impregnation material, the impregnation rate also being 500 to 2000 g of material per square meter. In all cases, the depth of impregnation is about 2 to 3 mm. The substance may be coloured, e.g. using a green pigment. Impregnation is effected on the surface of the floor situated on the side from which tufting is effected so as to promise penetration of the material.

A floor covering made as described above, is intended to be fixed by any appropriate means to a floor 5, with the bottom layer 2 of the floor covering being directly in contact with the floor. It is also possible to lay the floor covering over a layer of some suitable under-lay, however, to do so complicates and increases the expense of the laying operation, and is not usually necessary.

Figure 2:
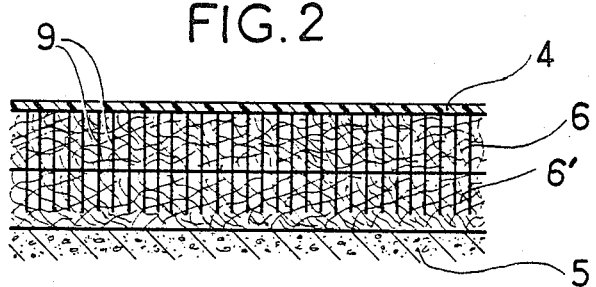
FIG. 2 is a cross-section through a second embodiment of floor covering in accordance with the invention.
Figure 3:
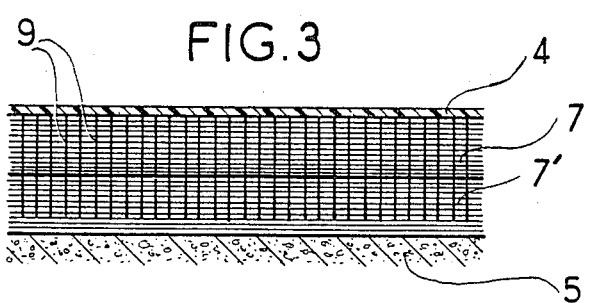
FIG. 3 is a cross-section through a third embodiment of floor covering in accordance with the invention.

Although FIG. 1 shows the floor covering to comprise a top layer 1 made from a tangle of short fibres and a bottom layer 2 made from continuous long fibres, other combinations are, of course, possible. In particular, FIG. 2 shows both layers 6 and 6' as being made from respective tangles of short fibres and FIG. 3 shows both layers 7 and 7' being made from respective sets of continuous long fibres. Further, although all the figures show a two-layer configuration, additional layers could be included, with all the layers being held together by the multiple needle perforations.

Naturally, it is always the top surface of the top layer which is impregnated with an abrasion-resistant, skin-forming substance.

Preferred manufacturing details of the floor covering shown in FIG. 1 are as follows:

The top layer is made from a tangle of short fibres. It is about 8 to 10 mm thick.

The bottom layer 2 is made from continuous long fibres. Its thickness is likewise about 10 mm.

The two layers are held together by multiple needle perforations at a density of at least 100 to 120 perforations per $cm^2$.

The impregnation material is obtained from the following mixture:
50 parts of an aqueous solution of styrene-butadiene with 50 percent of dry extract.
50 parts of an aqueous dispersion of acrylic resin with 50 percent of dry extract.
10 parts of a solution of melamine formaldehyde resin with 70 percent solids to cross-link the copolymer.
1 part of an acid catalyst for the melamine formaldehyde resin.
A green pigment is also added.

The top surface is impregnated with the abovementioned copolymer at a rate of 1000 gm per meter square.

The pressure applied for impregnation results in a total covering thickness of little more than 10 mm; and The weight of the floor covering is about 2.7 kg per $m^2$. The main advantages of the floor covering in accordance with the invention are as follows:

Firstly the abrasion-resistant skin 4 provides long-term protection against damage to the floor covering by animal hooves. Further, since it takes the shape of the top surface of the layer in which it is impregnated, the skin provides a rough, substantially non-slip surface for an animal to walk and stand on. The floor covering in accordance with the present invention is highly resilient with some elasticity, resulting in particular from the impregnation characteristics and which provide good comfort for the animal.

Secondly, the floor covering provides excellent thermal insulation between the animal and the floor. This is provided in the main by the air trapped in the layers of felt-like material. If an under-lay of some sort is used, it is preferable, from the point of view of animal comfort, to use a layer of foam rubber thereby providing softer and springier bedding for the animal.

Thirdly, the floor covering will not rot and is easy to clean using a jet of water. The floor covering is immune to chemical attack from the usual agricultural disinfectants, such as bleach, formaldehyde, soda, etc.. Thus occasional cleaning of its under-side with disinfectant is sufficient to ensure that bacteria do not proliferate on the under-side of the floor covering. Further, since air can circulate between the fibres of various layers, and since the skin is porous, the inside of the floor covering tends to remain dry enough to be inimical to bacteria. This is particularly true of floor covering used in stalls in which female animals (particularly cows) are constrained to stand further back in their stall than the position they occupy therein when lying down. This ensures that they defecate and urinate into a gully provided beyond the end of the floor covering. Such stalls are sometimes known as "cubicles" or "cow-kennels".

Fourthly, the floor covering is easy to lay on a gently sloping floor (say 1 or 2 in 100) by numerous techniques including nailing, glueing, stapling, etc.

Fifthly, the technique of assembling a plurality of layers of felt-like material means that a floor covering of thickness and consistency suitable for animal comfort can readily be built up from layers of felt-like material of thickness and consistency suitable for ease of manufacture.

Finally, the use of a floor covering in accordance with the invention leads to improved animal health, and hence productivity, both for milk production and for meat production.

Although the present invention has been particularly described for use with female animals in a particular kind of stall, it will be readily appreciated that the floor covering can also be used with male animals and with animals of either sex in other kinds of stabling, in particular, it is applicable to stables of horses and cattle, to loose boxes for horses, to pigsties, and to kennels for dogs or other small domestic animals.

The floor covering could also be used in public places subject to wear from a great number of pedestrians, for example: sports halls and stadiums, public halls, railway stations, airports, etc.

What is claimed is:

1. A floor covering for stables, said covering comprising at least two layers of textile material tufted together, said layers defined as a top layer and a bottom layer, a highly abrasion resistant material impregnated into the outer surface portion of said top layer, said impregnation material being sufficiently permeable to allow fluid evaporation therethrough, said impregnation material comprising a composition selected from the group consisting of an acrylic resin, a cross-linked copolymer of an acrylic resin and styrene, a cross-linked copolymer of an acrylic resin and styrenebutadiene, and polyvinyl chloride, said impregnation material being applied to said top layer in an amount of from about 500 to about 2,000 grams per square meter of top layer surface area.

2. The floor covering of claim 1 further comprising one or more additional textile layers disposed intermediate said top and said bottom layers.

3. The floor covering of claim 1 wherein said impregnation material comprises:
 (a) about 50 parts by weight of an aqueous solution of a styrenebutadiene resin having about 50% solids by weight; and
 (b) about 50 parts by weight of an aqueous dispersion of an acrylic resin having about 50% solids by weight; and
 (c) about 10 parts by weight of a melamine formaldehyde resin solution having about 70% solids by weight; and
 (d) about 1 part by weight of acid catalyst for cross-linking of the copolymer.

4. The floor covering of claim 1 wherein the depth of impregnation of said upper layer is about 2 to 3 mm.

5. The floor covering of claim 1 wherein the upper and lower layers each have a thickness of about 8 to 10 mm.

6. The floor covering according to claim 1, wherein at least one of said top and said bottom layers of textile material is made from a tangle of short fibers, and the other layer is made from continuous long fibers.

7. The floor covering according to claim 1 wherein each of said top and bottom layers of textile material is made from a tangle of short fibers.

8. The floor covering of claim 1 wherein each of said top and bottom layers of textile material is made from continuous long fibers.

9. The floor covering of claim 1 wherein said textile material is made from synthetic fibers.

10. The floor covering of claim 1 wherein said textile material is made from natural fibers that have been treated to prevent rotting.

11. The floor covering of claim 1 wherein said textile material comprises a mixture of synthetic and natural fibers.

12. The floor covering according to claim 1 wherein:
 (a) the depth of impregnation of said upper layer is from about 2 to about 3 mm; and
 (b) said upper and said lower layers each have a thickness of from about 8 to about 10 mm; and
 (c) each of said top and said bottom layers comprises a textile material selected from the group consisting of one or more of a tangle of short fibers and continuous long fibers; and
 (d) each of said top and said bottom layers comprises a textile material selected from the group consisting of one or more of synthetic fibers and natural fibers that have been treated to prevent rotting.

13. The floor covering of claim 11 wherein said impregnation material comprises:
 (a) about 50 parts by weight of a aqueous solution of a styrene-butadiene resin having about 50% solids by weight; and
 (b) about 50 parts by weight of an aqueous dispersion of an acrylic resin having about 50% solids by weight; and
 (c) about 10 parts by weight of a melamine formaldehyde resin solution having about 70% solids by weight; and
 (d) about 1 part by weight of acid catalyst for cross-linking of the copolymer.

14. The floor covering of claim 2 wherein said intermediate layers comprise a textile material selected from the group consisting of one or more of a tangle of short fibers and continuous long fibers and further comprise a textile material selected from the group consisting of one or more of synthetic fibers and natural fibers that have been treated to prevent rotting.

* * * * *